US010607164B1

(12) United States Patent
Wang (10) Patent No.: US 10,607,164 B1
(45) Date of Patent: Mar. 31, 2020

(54) ARCHITECTS SPACE PROGRAMMING PROCESS THAT DETERMINES NEW CLASSROOM SIZES AND COUNT FOR EDUCATIONAL INSTITUTIONS

(71) Applicant: Zichu Wang, Beijing (CN)

(72) Inventor: Zichu Wang, Beijing (CN)

( * ) Notice: Subject to any disclaimer, the term of this patent is extended or adjusted under 35 U.S.C. 154(b) by 0 days.

(21) Appl. No.: 16/524,140

(22) Filed: Jul. 28, 2019

(51) Int. Cl.
*G06Q 10/06* (2012.01)
*G06T 11/20* (2006.01)
*G06T 17/00* (2006.01)
*G06Q 10/10* (2012.01)
*G06Q 50/20* (2012.01)

(52) U.S. Cl.
CPC . *G06Q 10/06311* (2013.01); *G06Q 10/06375* (2013.01); *G06Q 10/109* (2013.01); *G06Q 50/205* (2013.01); *G06T 11/206* (2013.01); *G06T 17/00* (2013.01)

(58) Field of Classification Search
CPC .. G06Q 50/205; G06Q 50/2053; G06Q 10/10; G06Q 10/06375; G06Q 10/0631; G06Q 10/06311
See application file for complete search history.

(56) References Cited

U.S. PATENT DOCUMENTS

| | | | |
|---|---|---|---|
| 4,601,003 A | 7/1986 | Yoneyama et al. | |
| 5,310,349 A | 5/1994 | Daniels et al. | |
| 6,633,290 B1 | 10/2003 | Kung et al. | |
| 7,805,107 B2 * | 9/2010 | Shaver | G06Q 10/02 434/350 |
| 8,042,056 B2 | 10/2011 | Wheeler et al. | |
| 8,052,426 B2 * | 11/2011 | Snyder | G06Q 10/06311 434/365 |
| 8,170,465 B2 | 5/2012 | Griffin | |
| 8,564,589 B1 | 10/2013 | Aila et al. | |
| 8,699,939 B2 * | 4/2014 | German | G06Q 10/10 434/322 |
| 8,719,070 B2 * | 5/2014 | Jabbour | G06Q 10/02 705/7.22 |
| 8,750,781 B2 * | 6/2014 | Shaver | G06Q 10/02 434/350 |
| 2003/0005055 A1 | 1/2003 | Ralston et al. | |
| 2003/0065544 A1 * | 4/2003 | Elzinga | G06Q 10/04 705/7.18 |

(Continued)

OTHER PUBLICATIONS

Wang et al.; "A Classroom Scheduling Service for Smart Classes"; Mar. 2017; IEEE Transactions on Service Computing; vol. 10; No. 2; pp. 155-164 (Year: 2017).*

(Continued)

Primary Examiner — John Villecco (57) ABSTRACT

Subject invention is a method that determines classroom needs for higher education institutions when they consider new buildings. The architect in charge of programming the new building can use existing tools available to them, in effect computer hardware and 3d modeler software, and utilize this method, which first plots classes as boxes in a virtual 3d space from course schedule data, then uses application programming interface (API) to execute geometry intersections, next performs matching processes to determine the number and sizes of classrooms needed for the course schedule, and lastly visualize room utilization and matching results on a computer screen.

1 Claim, 7 Drawing Sheets

(56) References Cited

U.S. PATENT DOCUMENTS

| | | | |
|---|---|---|---|
| 2004/0009461 A1* | 1/2004 | Snyder | G06Q 10/06311 434/350 |
| 2004/0115596 A1* | 6/2004 | Snyder | G09B 7/02 434/118 |
| 2005/0106549 A1* | 5/2005 | Parija | G06Q 10/06375 434/362 |
| 2006/0105315 A1* | 5/2006 | Shaver | G06Q 10/02 434/362 |
| 2006/0149699 A1* | 7/2006 | Wolfston | G06Q 10/10 |
| 2008/0057482 A1* | 3/2008 | Snyder | G06Q 10/06311 434/350 |
| 2008/0208664 A1* | 8/2008 | Parija | G06Q 10/06375 705/7.37 |
| 2010/0159438 A1* | 6/2010 | German | G06Q 30/02 434/433 |
| 2010/0227306 A1* | 9/2010 | Lofthus | G06Q 10/10 434/350 |
| 2011/0202184 A1* | 8/2011 | Shaver | G06Q 10/02 700/277 |
| 2011/0264482 A1 | 10/2011 | Rahmouni et al. | |
| 2012/0022906 A1* | 1/2012 | Snyder | G06Q 10/06311 705/7.13 |
| 2015/0356699 A1* | 12/2015 | Velozo | G06Q 10/063112 705/326 |
| 2018/0204147 A1* | 7/2018 | Koitz | G06Q 10/025 |
| 2019/0272509 A1* | 9/2019 | Livnat | G06Q 10/1095 |

OTHER PUBLICATIONS

Khandelwal et al.; "An Innovative Approach of Classroom Scheduling: SmartClass: A Review"; 2018, 2018 Second International Conference on Advances in Electronics, Computer and Communications; pp. 1-4 (Year: 2018).*

Torres-Ovalle et al.; "University Course Scheduling and Classroom Assignment"; Jul. 2014; Ingenieria y Universidad; vol. 18, Issue 1; pp. 1-17 (Year: 2014).*

Pennsylvania State System of Higher Education, Facilities Manual, vol. VI-B, p. 1, 2008.

Aldy Gunawan, Kien Ming Ng, Kim Leng Poh, Solving the Teacher Assignment-Course Scheduling Problem by a Hybrid Algorithm, World Academy of Science, Engineering and Technology, 33, 2007.

* cited by examiner

Figure 4. Matching

Numbers represent session capacity demand

Figure 5. Process flowchart

Figure 6. Expanded process 11

Figure 7. Expanded process 20

ARCHITECTS SPACE PROGRAMMING PROCESS THAT DETERMINES NEW CLASSROOM SIZES AND COUNT FOR EDUCATIONAL INSTITUTIONS

CROSS-REFERENCE TO RELATED PATENT APPLICATIONS a. U.S. Pat. No. 8,564,589B1
b. US20110264482A1
c. US20030005055A1
d. U.S. Pat. No. 8,170,465B2
e. U.S. Pat. No. 4,601,003A
f. U.S. Pat. No. 5,310,349A
g. US20040009461A1
h. US20040115596A1
i. US20030065544A1
j. U.S. Pat. No. 8,042,056B2
k. U.S. Pat. No. 6,633,290B1
l. KR101555527B1

FEDERALLY SPONSORED RESEARCH a. Not applicable

SEQUENCE LISTING OR COMPUTER PROGRAM ON CD a. Not applicable

BACKGROUND+ADVANTAGES, STATING KNOWN PROBLEMS AND CRITICIZE RELEVANT PRIOR ART AND LISTING ADVANTAGES OF PROPOSED INVENTION a. Background—calculating classroom needs that satisfy a certain course schedule can be a data analysis architects may not be trained to perform effectively, but it's integral to the space programming of an institutional building, which usually is a key service provided by an architect. Below are some methods of the trade, considered as prior arts.
  i. Some deal with timetabling, but they tend to be over complicated and inaccessible to architects for their purpose. One example is covered in the research paper *Solving the Teacher Assignment—Course Scheduling Problem by a Hybrid Algorithm*. (see appendix A) Its authors seek to find a scheduling of the courses so they fit existing rooms. However in planning for new classroom buildings, there is already a set course schedule that is the best-yet product of student and faculty desires. The knowledge barrier to carry out the study described in the paper is beyond an architect's training. Also, considering the cultural and political constraints in setting class meeting times, architects need not shuffle the entire course schedule as a way to "optimize" it (timetabling). Architects, who are planning for new buildings, only need to find a set of rooms with sizes that can accommodate the majority of existing schedule, which has likely been tested by time.
  ii. Another very popular method approaches classroom-planning with top-down parameters such as weekly contact hours. They offer an equivalent number of classrooms for a total number of students and their overall in-class hours. I consider these methods vague and "rule-of-thumb" in nature because they are based on the arithmetic average and a simple equation. Assignable square footage=station size x weekly student contact hours/average weekly room hours/utilization rate. See appendix B.
  iii. Course schedules may have been visualized by architects such as this white paper by Sasaki (http://www.sasaki.com/blog/view/1077/). However, the method is used only in the context of understanding existing space conditions. No geometric computing (intersection of shapes or vectors) on the graph is executed to size future classrooms. The visualization is only used as diagnosis, not prognosis, as it states " . . . visually displays existing course schedule information to easily understand the relationship . . . ".
b. There are some patents related to subject invention. However alone none of them can perform the task concerned.
  i. A ray-box intersection patent lays foundation for API call. The patent concerns the performance of such computing and at the moment the method is available through many commercial software. U.S. Pat. No. 8,564,589B1
  ii. A proposed method of matching resources is similar in process but in the embodiment context it will not find number of resources or number of "unmatched task" (class sessions in my case). US20110264482A1 (abandoned)
  iii. A proposed patent for scheduling reservations at a facility is similar in matching preferences to spaces but it does not apply to embodiment case as it hinges upon already knowing the "client preferences" (room sizes). US20030005055A1 (abandoned)
  iv. A patent for assigning teachers to students. This method has matching algorithm but is not suitable for space finding. This method assumes spaces are provided at fixed quantity. U.S. Pat. No. 8,170,465B2
  v. A patent for visually arranging representations of physical documents is loosely similar to the idea of showing classes as boxes on computer screens. U.S. Pat. No. 4,601,003A
  vi. A patent that make use of computer graphics to represent facility assets such as classrooms. However it does not provide quantitative analysis. U.S. Pat. No. 5,310,349A
  vii. A patent that schedules classes given the educational resources. Helpful in starting a course schedule but least useful for determining classroom needs for a given course schedule. US20040009461A1, US20040115596A1
  viii. A patent that schedules classes and optimizes the schedule. Not applicable to the embodiment case. Course schedule is a given and only manual intervention of a few sessions is appropriate. US20030065544A1
  ix. Previous technologies in visualizing geometries are related, because the proposed method uses market software that embed those technologies. U.S. Pat. No. 8,042,056B2, U.S. Pat. No. 6,633,290B1
  x. A patent that provide an architecture (computing) for data visualization but does not produce analytical results from geometry intersections on the visualizations. KR101555527B1
c. Advantages of the proposed method of determining classroom needs are:
  i. utilizing tools already familiar to architects (i.e. computer interface, common market software for 3d modeling etc.)

ii. analyzing course schedule data bottom-up, each class accounted for iii. keeping course offering schedule intact at large, exposing pinch points when needed for review iv. producing graphic representations that diagrams class fitting clearly v. producing graphic representations that can be stylized by architect as instruments of professional service (e.g. drawings)

vi. producing results rapidly and automatically

SUMMARY, DESCRIBING INVENTION AS CLAIMED a. The proposed method helps architects in programming phase of institutional projects plan for number and sizes of classrooms according to a given course schedule. The method uses common computer hardware and software readily available at architectural practices.

b. Classes to be held in new classrooms are provided in a spreadsheet format. Their meeting times of a day, meeting days of the week, and capacities are parsed. With 3d modeler software's geometry engine, boxes representing classes are visualized in a 3d virtual space for architect's understanding.

c. It is key, however, to call 3d modeler's geometry computation, particularly a ray-box intersection to get cross sections of sampled time instances. Each instance carries class information.

d. By running two size-matching processes going through each intersection instance, the method will produce a number of classrooms and their sizes that will satisfy the near entirety of the course schedule. Unaccommodated sessions will be identified. They are few in number and needs human attention for potential reschedule.

e. Utilization of the projected classrooms are visualized on a computer screen in the form of strips spanning across the hours of the day. Any gaps in the strip will be times when that classroom is open.

REFERENCE NUMERALS (IF ANY) REFERRING TO PARTS WITHIN DRAWINGS a. Noted in FIGS.

Figure 1:
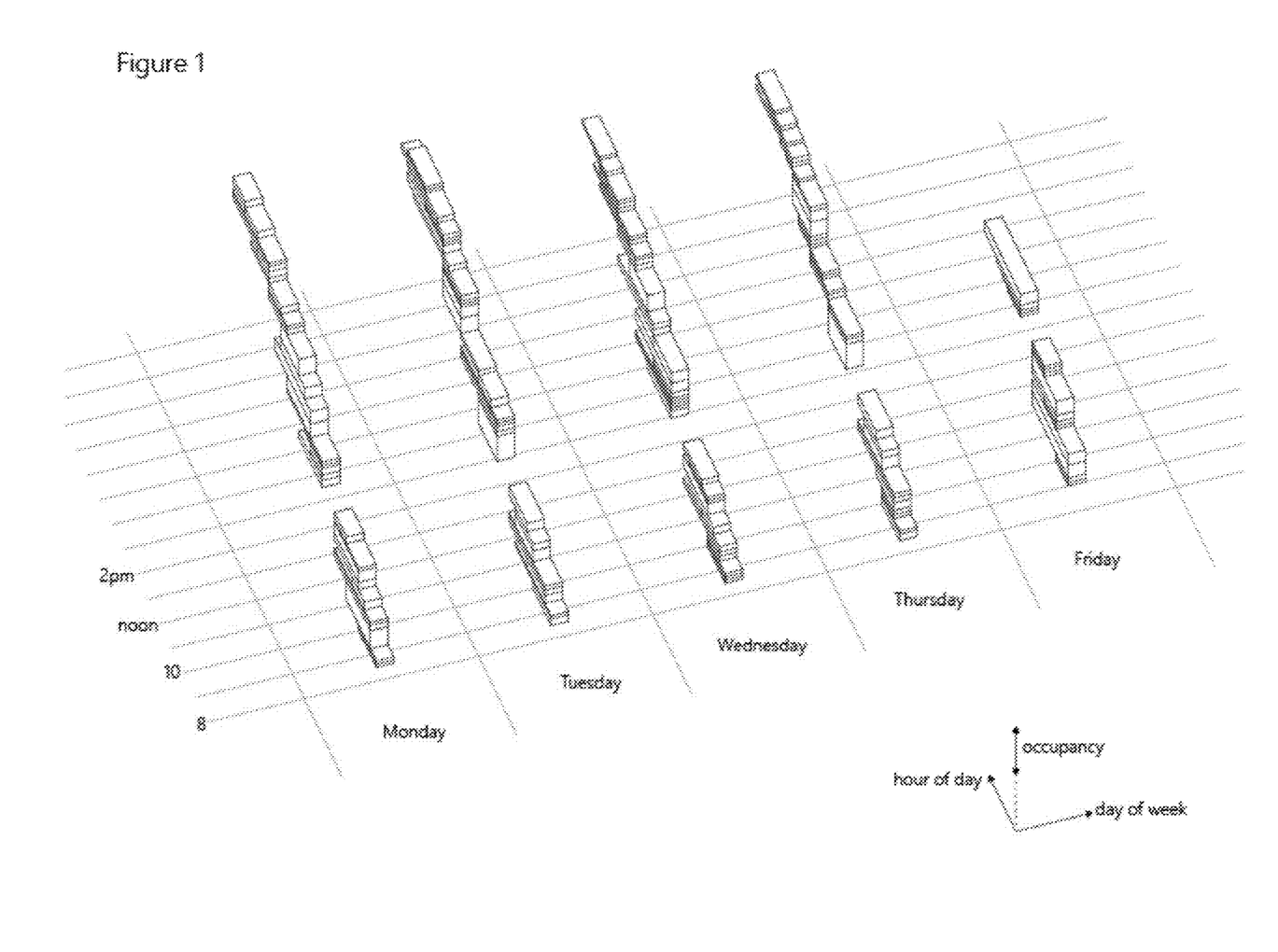
FIG. 1—courses visualized as boxes in a virtual 3d space b.
Figure 2:
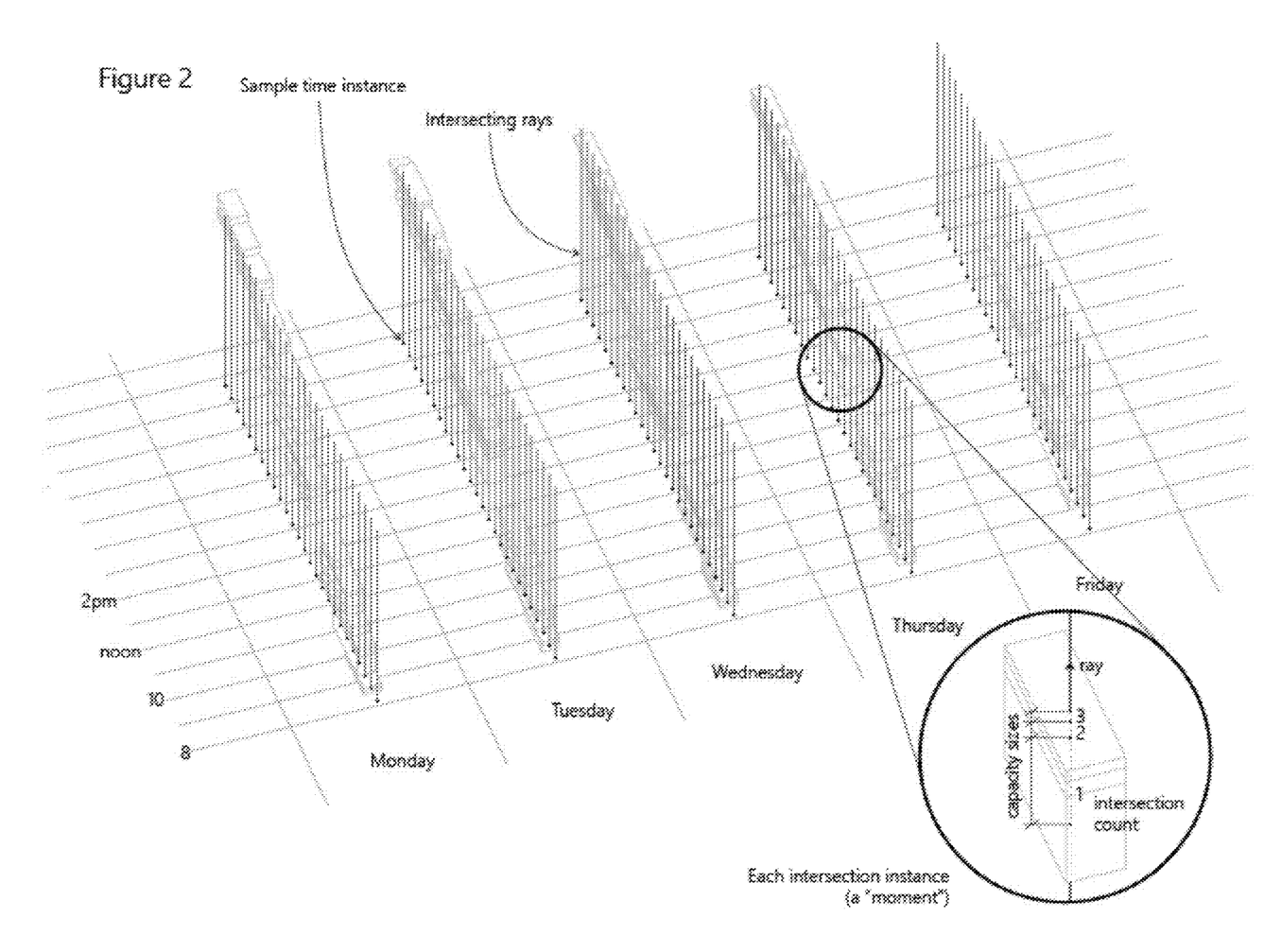
FIG. 2—time instance intersecting course boxes to record information c.
Figure 3:
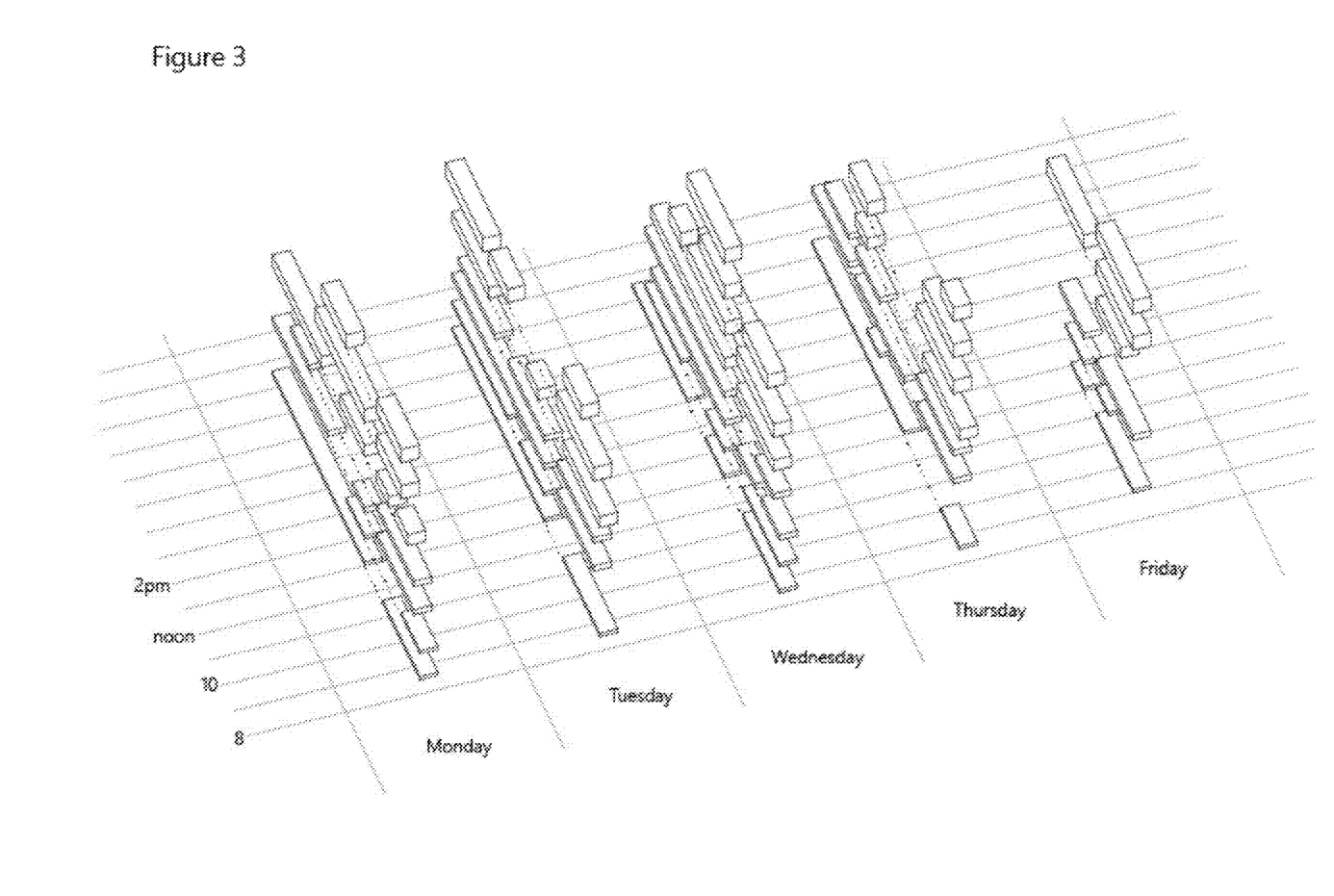
FIG. 3—utilization visualization of each proposed classroom d.
Figures 4, 41:
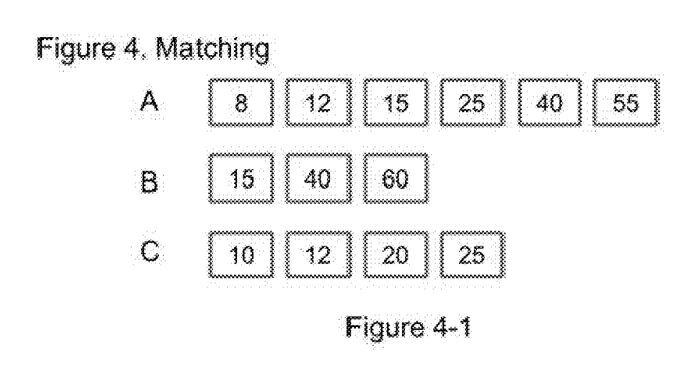
FIG. 4—matching sessions to space, steps e.
Figure 5:
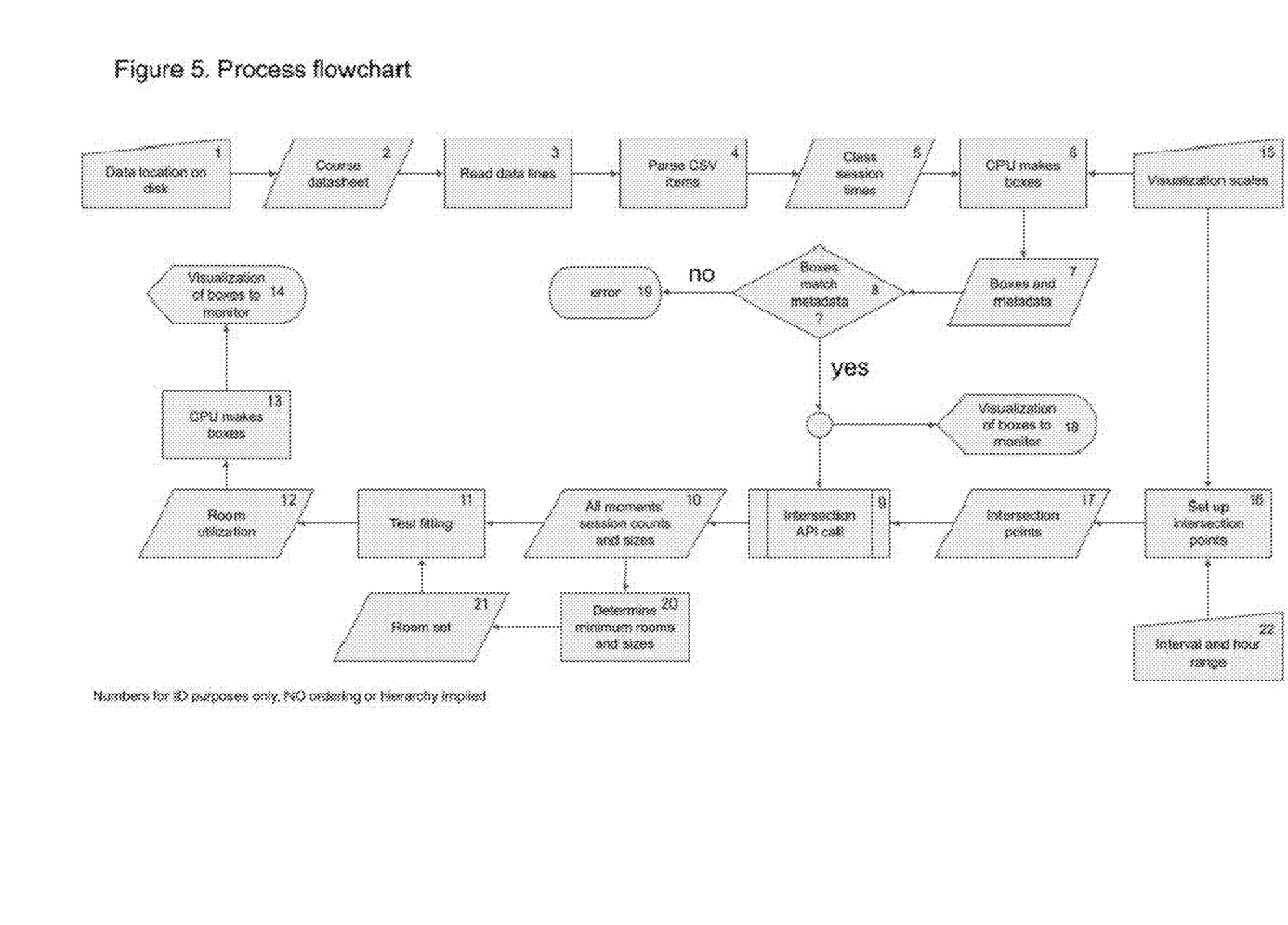
FIG. 5—overall method flowchart f.
Figure 6:
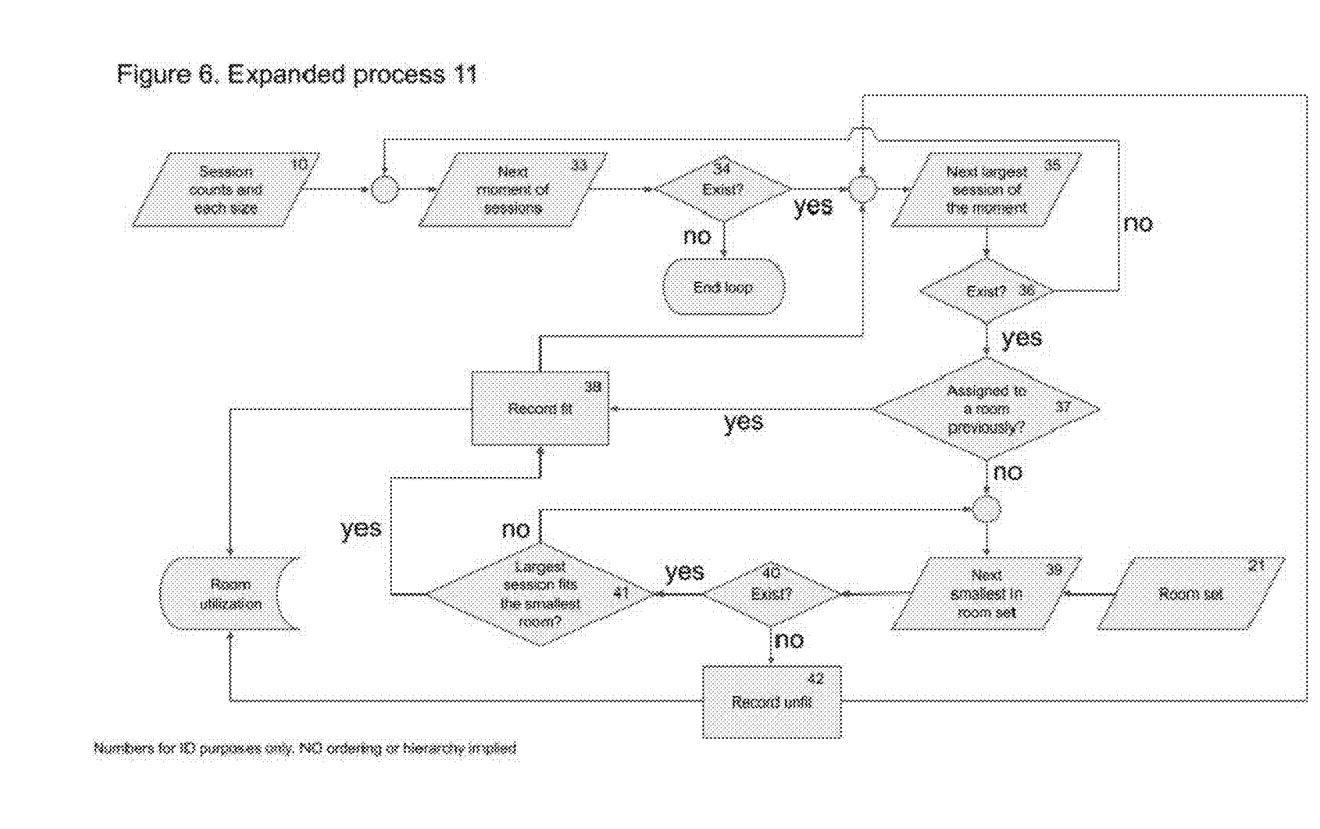
FIG. 6—flow chart of determining classroom number and sizes first pass with matching algorithm g.
Figure 7:
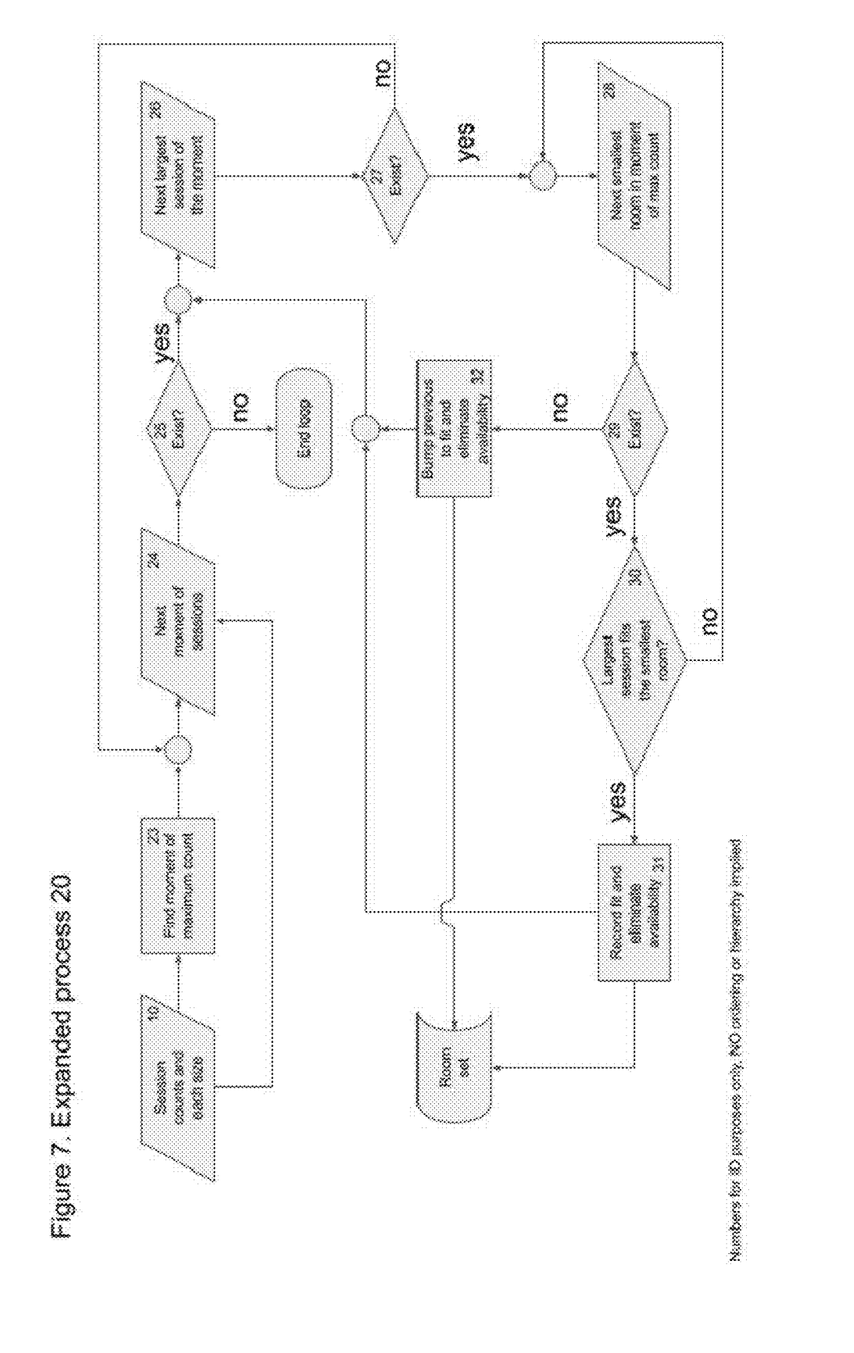
FIG. 7—flow chart of fitting courses in found rooms and record potential sessions without accommodation
Figure 42:
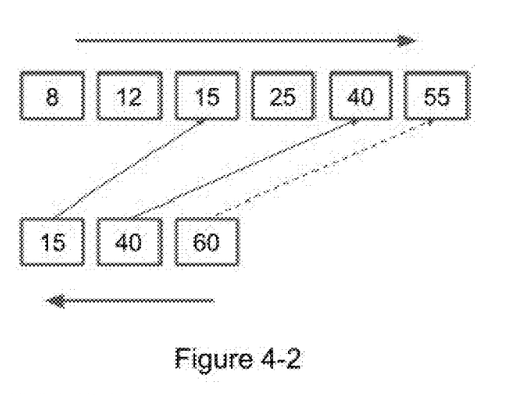
Figure 43:
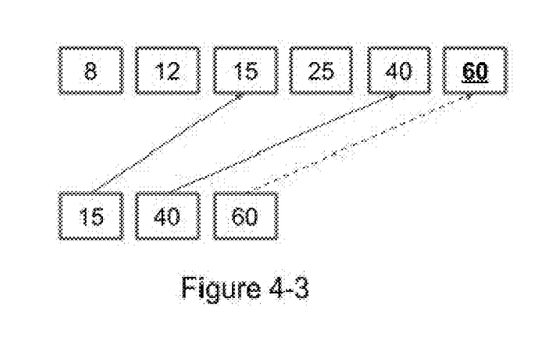
Figure 44:
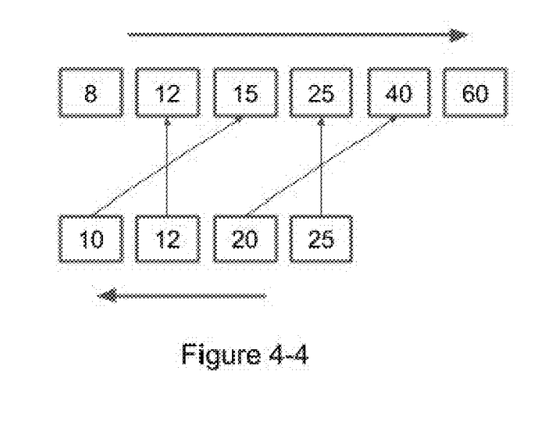

DETAILED DESCRIPTION a. In order to apply the method of classroom-finding, the tools and data must be acquired. Mostly any current consumer grade computer with CPU, memory, input devices (mouse and keyboard), and monitor will suffice. The computer can run on any popular operating system. A dedicated 3d modeling software with geometric computing algorithms must be installed. Data comes in the form of spreadsheets with the following information describing each of the university courses that will be held in future classrooms to be determined.

i. Name or ID of course ii. Session meeting times of a day iii. Session meeting days of a week iv. Maximum enrollment capacity of the course b. Course data is first converted to CSV files. Each course will occupy a line. Each line contains the above four items separated by commas. The proposed method will first read such formatted CSV files and load the information into computer memory (FIG. 5, process 1 to 4).

c. The method will also allow human input of display scale factors such as 0.5 or 12 and store this information in computer memory (FIG. 5, process 15). Utilizing the coordinate system of 3d modeler software, the class information is translated into box shapes by the following steps i. First the information from CSV will be retrieved from memory and parsed into the four items listed above (name, meeting times, meeting days, capacity) for each course (FIG. 5, process 5).

ii. Meeting time start and end, such as 10 am to 11:30 am will be used as the Y-axis domains of a box (depth). The capacity of the class will be used as the Z-axis height of the box. An arbitrary X-axis width is assigned to be visually clear and to facility geometric computing later. The box object is made by using 3d modeler's constructor functions. The box object is stored in memory.

iii. The scale factors stored from input will be retrieved from memory. They are used to stretch the box dimensions. For example, if a scale factor of 2 is input for the Y-axis, there will be stretching in depth of a box. Using 10 am to 11:30 am again, the end representing 10 am will be placed at the 10×2=20th unit mark of Y-axis, and the box continues till the 11.5×2=23rd unit mark. By this rubric, the box can be placed in the 3d virtual environment of the modeler software.

d. My method will cycle through the boxes saved in memory and place them one by one in the 3d virtual space. Because each course-box's Z-axis height is relative, the absolute placement is determined by avoiding box conflicts. For example if a course-box is placed at 15 unit mark at its bottom on Z-axis and its height is 30 (30 person class), the next course-box will be placed at 45 unit mark of Z-axis going upwards. The placement will also look at the meeting days of the course-box and push it along the X-axis into "slots" representing days of the week.

e. The course-boxes placed in the 3d virtual space will be visualized by the 3d modeler, which flushes the image to computer monitor. By using the 3d modeler's orbit function, a user can navigate the 3d visualization of courses by interfacing with mouse and keyboard. A version of this visualization can be seen in FIG. 1, where the scale factors are 10 for X-axis, 1 for Y-axis, and 0.01 for Z-axis.

f. The next step is to sample time instances through the hours of the day, which are now represented by the Y-axis values (scaled). An input value for the frequency (minutes) of the sampling will be stored in memory. They are converted into decimals of the Y-axis unit system in the following formula i. $Y\text{-axis increment} = \text{interval minutes}/60 * Y\text{-axis scale factor}$ g. On each day of the week, points representing the sampling at each increment mark are generated by 3d modeler and stored in memory. They are only plotted in the visualization on screen on demand. They can be plotted to help understand the process as seen in FIG. 2. If interval is 15 minutes and Y scale is 1. A point with Y value at every 0.25 unit can be plotted, starting from earliest session's beginning to the end time of last session. The X values of these points correspond to the day they belong to. They all carry Z value of 0.

h. From these point objects, a 3d modeler function is called to generate vector rays and store them in memory. The points are start points and the direction is Z positive. FIG. 2 diagrams these rays, which will geometrically intersect the course boxes positioned in virtual space. The intersection events are recorded with the number of boxes intersected, and the distance the ray travels within each intersecting box. The number of intersected boxes is the number of concurrent class sessions at that moment (time instance), and the distances travelled are equivalent to the height of the box, which tells the capacity for enrollment that course has.

i. With all moments' information recorded, they are sorted by number of concurrent sessions. The moment with most will provide a template number of classrooms and their sizes. Because there will be no other moments with more simultaneous sessions than this, the number of classrooms is determined. This max moment is made available for any query in memory.

j. Process 20 in FIG. 5 is the method to determine if the sizes at that max moment is enough to accommodate all possible moments. FIG. 7 further details the method. For illustration sake, assume the time instances from previous steps look like what's shown in FIG. 4-1.
  i. Moment A is found to be the max moment and the method remembers it as base template. Then it moves to moment B.
  ii. The method takes the largest of moment B and goes through the template from smallest to largest. The first in A that fits this session in B will be used to accommodate the session and eliminated from A temporarily.
  iii. Method goes down B from largest to smallest and repeat the previous step, as illustrated in FIG. 4-2
  iv. If a session in non-max moment cannot find a room large enough, like the 60 person session in B, the largest of the available rooms in max moment will be bumped up to the necessary size. FIG. 4-3 reflects this change.
  v. FIG. 4-4 shows the method going through moment C and find all fits. This is the end of the sizing process and the list of available rooms has been updated in memory.

k. Process 20 makes sure that in theory each time instance is satisfied by the resultant list of available rooms. Following process 20, a process 11 must be followed conducted to identify possible overflow. Process 20 does not consider the continuity of classes. Process 11 will essentially repeat process 20 but remembers assignments of sessions in previous moments.

l. Process 11 is illustrated in FIG. 6. When matching (FIG. 4) happens in process 11, the ID of each course is drawn from memory besides the capacity so the method can first look at the moment prior and see if this same session already was assigned to a room. If so, the method will directly assign the same room. Afterward, the matching algorithm (FIG. 4) will be conducted. However, because process 20 already find a version of the sizes of the classrooms, process 11 will NOT bump any "max moment" rooms up in size. Any session that is not accommodated this time will be recorded.

m. Overflow in process 11 is decidedly not increasing classroom inventory, because empirically these sessions are vastly small in number and highly likely open to rescheduling to the gaps of utilization (see below).

n. As session of each moment is assigned to a room in process 11, the assignment is recorded in memory. After process 11, the list of overflow sessions will be sent to monitor and a user sees a list of text describing the ID and capacity of these class sessions.

o. Reading from memory the assignments of sessions and the list of desirable classrooms, a graph (FIG. 3) can be produced to visualize utilization of these classrooms.
  i. With the given sampling frequency, a unit duration on Y-axis is determined. For example, a scale factor of 1 and a sample of 15 minutes means a 0.25 Y-axis unit
  ii. My method loops through time instances for each room, and read memory if this room is taken for a session. If the room is taken at this moment, a box is made by 3d modeler and recorded in memory.
  iii. The Y dimension of this box is the unit duration. The Y-axis location corresponds to the time instance mark. The height (Z dimension) of the box represents the capacity. An arbitrary width in X-axis is given for 3d visualization.
  iv. For each classroom, boxes representing all occupied time instances is placed at the same Z-axis position. If two unit boxes are next to each other, the seam between can be neglected.
  v. The resultant "strip" represents the utilization of the room throughout the day. A continuous strip as seen in FIG. 3 means the room will host classes throughout that time span. Any gaps in the strip means the room opens up.
  vi. Classrooms are distinguished by placing the utilization unit boxes at different Z-axis positions. After method loop completes, the recorded "strips" will be flushed to computer monitor for visualization by the 3d modeler. Each strip can be arbitrarily colored to help users identify classrooms.

p. The user now has information on how many classrooms are likely needed, the few overflow sessions, and the predicted utilization of the classrooms. The graphics are interactive and intuitive in a 3d virtual space.

SEQUENCE LISTING a. Not applicable

The invention claimed is:

1. An automated process that determines, from class schedule data, a number and sizes of required classrooms using a computer processor, memory and display monitor, comprising:
 a. creating virtual boxes, using said computer processor, which represent individual class sessions, proportionally, from class schedule data, before storing the virtual boxes in said memory;
 b. performing ray-box intersections on the virtual boxes, using said computer processor, to get a plurality of momentary class session counts and each class's occupant count, which are then stored in said memory;
 c. completing a first seeking algorithm in said computer processor and recording first result information in said memory, where in a first step, a number of classrooms is set to a maximum number of the plurality of momentary class session counts and their sizes in said memory, in a second step, each of said class session and its occupant count of each moment is compared to the number of classrooms in the first step, and lastly, any larger momentary session count or occupant count of the plurality of momentary class session counts and occupant count inflates the number or sizes of classrooms in the first step and storing this result as the first result information in said memory;

d. completing a second seeking algorithm in said computer processor using said first result information and recording second result information in said memory, where said individual class sessions and its occupant count of the plurality of moments are compared to the resultant number of classrooms from the first seeking algorithm, while maintaining that the same session across different moments cannot change spaces, and any overflow information is marked in said memory to obtain a utilization of resultant classrooms as the second result data;

e. sending the second result data from the second seeking algorithm from said computer processor to said memory, from which said display monitor is used to display the utilization of resultant classrooms to a user in text form;

f. creating resultant virtual unit boxes, via API execution in said computer processor, as voxels representing an occupied utilization of said resultant classrooms and sending the voxels to said display monitor to show the utilization as graphs to the user.

\* \* \* \* \*